(12) United States Patent
Yoshida et al.

(10) Patent No.: US 7,174,799 B2
(45) Date of Patent: Feb. 13, 2007

(54) HYDRAULIC TENSIONER

(75) Inventors: Osamu Yoshida, Osaka (JP); Hiroyuki Miyake, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/247,621

(22) Filed: Oct. 11, 2005

(65) Prior Publication Data

US 2006/0094549 A1 May 4, 2006

(30) Foreign Application Priority Data

Nov. 2, 2004 (JP) .............................. 2004-319597

(51) Int. Cl.
*F16H 21/44* (2006.01)
*F16H 21/54* (2006.01)
*F16H 25/18* (2006.01)

(52) U.S. Cl. .............................. 74/110; 74/101; 74/109

(58) Field of Classification Search ................ 474/101, 474/109, 110, 111; 137/539, 539.5, 198, 137/199
See application file for complete search history.

(56) References Cited

U.S. PATENT DOCUMENTS

| 4,772,251 A * | 9/1988 | Goppelt et al. ............. 474/101 |
|---|---|---|
| 5,314,388 A | 5/1994 | Suzuki et al. |
| 5,643,117 A * | 7/1997 | Dembosky ................... 474/110 |
| 5,993,342 A * | 11/1999 | Wigsten et al. .............. 474/110 |
| 6,244,982 B1 * | 6/2001 | Merelli ....................... 474/138 |
| 6,435,993 B1 | 8/2002 | Tada |
| 6,945,889 B2 * | 9/2005 | Markley et al. ............. 474/110 |
| 2004/0266572 A1 * | 12/2004 | Yoshida et al. .............. 474/110 |
| 2005/0227799 A1 * | 10/2005 | Yoshida ....................... 474/110 |
| 2005/0255952 A1 * | 11/2005 | Yoshida ....................... 474/110 |
| 2005/0265856 A1 * | 12/2005 | Yoshida ....................... 417/362 |

FOREIGN PATENT DOCUMENTS

| EP | 1 101 975 A2 | 1/2001 |
|---|---|---|
| EP | 1 101 975 A3 | 1/2001 |
| JP | 2001-021011 | 1/2001 |

* cited by examiner

*Primary Examiner*—Richard Ridley
*Assistant Examiner*—Terence Boes
(74) *Attorney, Agent, or Firm*—Howson & Howson LLP (57) ABSTRACT

In a hydraulic tensioner, a deairing valve unit comprising a synthetic resin ball guide, a check ball a biasing spring, a ball seat, and a retaining disc, is press-fit into a hollow plunger, and disposed adjacent the protruding end of the plunger. The ball and seat of the deairing valve unit are arranged to block flow of oil out of the tensioner when the oil is under pressure, but open to allow air to flow out of the tensioner, through a vent in the protruding end of the plunger, after a negative pressure condition occurs inside the oil chamber of the tensioner.

16 Claims, 9 Drawing Sheets

HYDRAULIC TENSIONER

FIELD OF THE INVENTION

This invention relates to hydraulic tensioners for applying proper tension to endless, flexible, traveling power transmission media, for example, timing belts or timing chains which transmit rotation between the crankshaft and one or more camshafts of an internal combustion engine. The invention relates more particularly to an improved deairing mechanism for venting air from the high pressure oil chamber of a hydraulic tensioner.

BACKGROUND OF THE INVENTION

Figure 9:
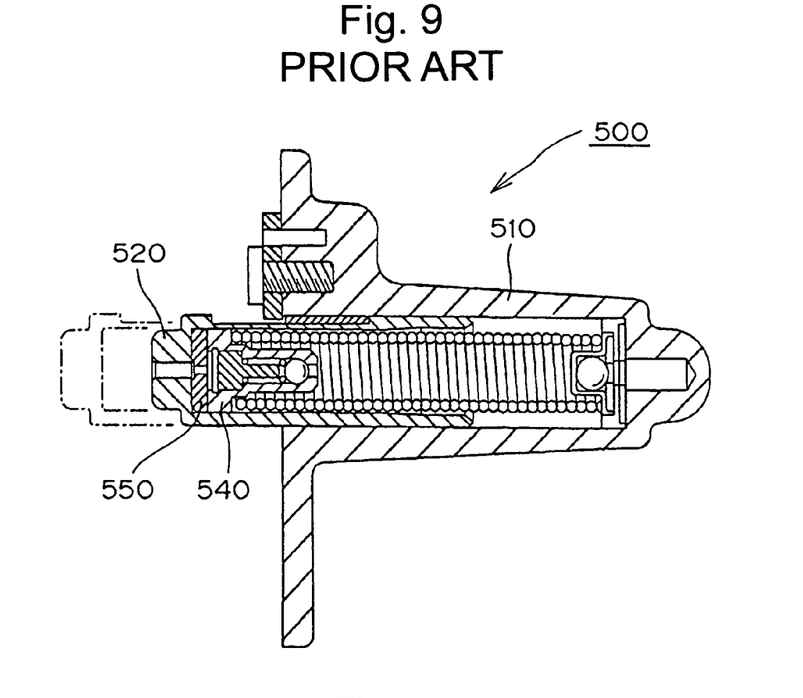
FIG. 9 is a cross-sectional view of a conventional hydraulic tensioner.
Figure 10:
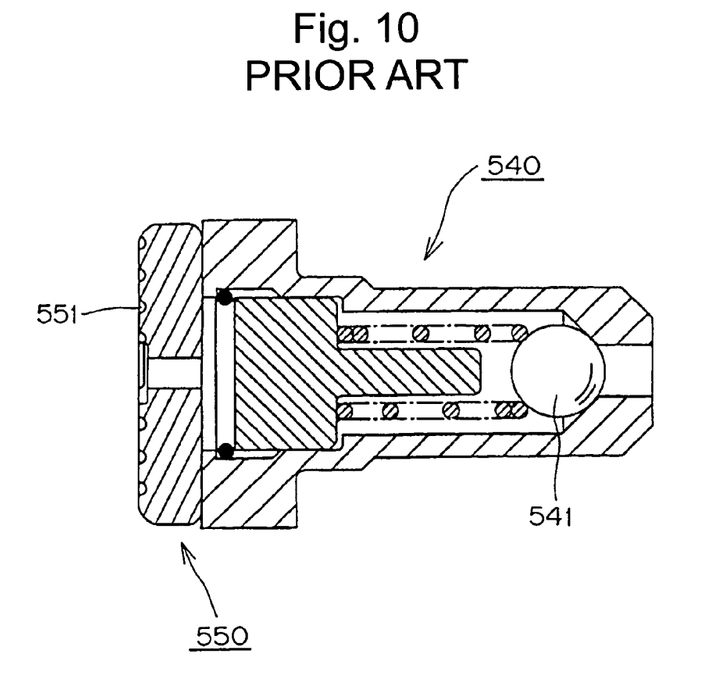
FIG. 10 is an enlarged view of the air venting check valve unit of the tensioner shown in FIG. 9.

Hydraulic tensioners are widely used to suppress backlash and vibration due to a changes in tension in timing belts and timing chains. A typical hydraulic tensioner comprises a plunger slidable in, and protruding from, a housing. The plunger and housing cooperate to provide a high pressure oil chamber into which oil is introduced through a ball-type check valve. FIGS. 9 and 10 show a conventional hydraulic tensioner 500 having an air venting feature. In the tensioner, a hollow plunger 520 is slidable in, and protrudes from, a hole of a housing 510, the plunger being biased in the protruding direction by a spring. A pressure relief valve assembly 540 is incorporated within the protruding end of the hollow plunger 520. The pressure relief valve assembly includes an air vent disc 550, having a spiral groove 551 formed in one of its faces. The grooved face of the air vent disc abuts the end wall of the interior of the plunger, forming a spiral passage through which air, mixed with the oil inside the high pressure oil chamber, can be exhausted to the outside of the tensioner through an opening formed in the end of the plunger. The air venting mechanism of the tensioner of FIGS. 9 and 10 is described in U.S. Pat. 6,435,993.

In the tensioner of FIGS. 9 and 10, it is extremely difficult to set the optimum clearance established by the end wall of the interior of the plunger and the spiral groove in the air vent disc 550. Furthermore, the ball 541 of the relief valve assembly 540 can allow excessive flow of oil out of the tensioner when the plunger is pushed into the housing 510, preventing the required high pressure from being maintained in the housing. Another problem with the tensioner of FIGS. 9 and 10 is that the pressure relief valve assembly 540 and the air vent disc 550 are separately manufactured parts, and must be handled separately in the process of assembly of the tensioner. Consequently, assembly of the tensioner is difficult, and its cost of manufacture is high.

Objects of this invention are to solve the above-mentioned problems, and to provide a hydraulic tensioner in which high pressure in the housing is reliably maintained when required, in which release of air mixed with oil in the high pressure oil chamber occurs only when a negative pressure condition exists inside the oil chamber. It is also an object of the invention to provide a tensioner which has superior endurance and strength, and which can be assembled easily.

SUMMARY OF THE INVENTION

The tensioner according to the invention comprises a housing having a plunger-receiving hole with a bottom, and a plunger slidably disposed in the plunger-receiving hole and protruding therefrom. The plunger has a protruding end for applying tension to an endless, flexible, traveling power transmission medium, and is hollow, having an opening facing the bottom of the plunger-receiving hole, and an end wall adjacent the protruding end. The housing and plunger cooperate to form a high pressure oil chamber, part of which is composed of at least a part of the interior of the plunger, and part of which is composed of a part of the interior of the plunger-receiving hole not within the plunger. An exhaust vent is formed in the protruding end of the plunger.

A plunger biasing means, preferably a spring or an assembly of coaxial springs, extends into the interior of the hollow plunger, and is disposed between the bottom of the plunger-receiving hole and the end wall of the plunger to urge the plunger in the protruding direction.

A deairing valve unit for releasing air from the high pressure oil chamber through the exhaust vent, is disposed inside the hollow plunger adjacent the protruding end. The deairing valve unit comprises a ball guide, a ball seat secured to the ball guide, a check ball disposed in the ball guide and freely movable toward and away from the ball seat, a ball biasing spring biasing the check ball toward the ball seat, and a disc-shaped retainer, also secured to the ball guide. The retainer limits movement of the check ball away from the ball seat, and seals the check ball in the ball guide so that the check ball is disposed between the retainer and the seat. The check ball is disposed on a side of the ball seat facing the interior of the high pressure oil chamber. Therefore, outflow of oil due through the exhaust vent due to an increase in pressure within the high pressure oil chamber is blocked by the seating of the check ball on the seat, but the ball is movable away from the seat as a result of negative pressure within the high pressure oil chamber to permit release of air from within the high pressure oil chamber through the exhaust vent.

The tensioner also preferably comprises a check valve unit disposed within the plunger-receiving hole adjacent the bottom thereof, for blocking backflow of oil from the high pressure oil chamber.

The ball guide of the deairing valve unit is preferably composed of synthetic resin, and the retainer and the ball seat in the deairing valve unit are secured to the ball guide by circumferential caulking flanges formed as portions of the wall of the ball guide.

The ball guide in the deairing valve unit also preferably has a tapered outer wall, having a large diameter at an end thereof adjacent the retainer, and a smaller diameter at an end thereof adjacent the ball seat, and is press-fit into the interior of the plunger.

In a preferred embodiment of the invention, the plunger biasing means comprises an outer spring, which abuts the ball guide of the deairing valve unit, and an inner spring, disposed inside, and in coaxial relationship with, the outer spring.

The deairing valve unit within the plunger suppresses backlash and fluttering due to excessive changes in tension in the timing belt, timing chain or the like, and particularly backlash and fluttering due to the influence of air in the high pressure oil chamber at engine start-up. Since the check ball in the deairing valve unit is biased by a ball valve biasing spring toward the end wall of the interior of the plunger, the difficulties in setting the clearance in the spiral groove deairing structure of a conventional hydraulic tensioner are avoided. Moreover, even when the plunger is pushed back by an excessive force, outflow of a pressure oil is blocked, and the pressure within the high pressure oil chamber can be maintained. However, when a negative pressure has existed inside of the housing, air which has entered the housing be easily exhausted through a vent provided in the protruding end of the plunger.

When a check valve unit is incorporated into the bottom of the plunger-receiving hole to block the backflow of oil from the high pressure oil chamber, even if the plunger is rapidly moved backward by an excessive increase in tension, the tensioner can resist the impact force by preventing oil from flowing out of the high pressure chamber toward the oil supply.

When the retainer and the ball seat of the deairing valve unit are secured by flanges formed by portions of the wall of the synthetic resin ball guide so that the flanges serve as caulking, the retainer and the ball seat are firmly integrated with the ball guide so that they will not be dropped in the assembly process, and the steps carried out in the assembly of the tensioner, including the incorporation of the deairing valve unit into the interior of the plunger are significantly simplified.

The tapered configuration of the ball guide of the deairing unit facilitates the press-fitting of the deairing valve unit into the interior of the plunger, so that the deairing valve unit can be reliably and firmly incorporated into the plunger without a reduced risk of dropping the deairing valve unit in the assembly process.

Furthermore, when the plunger biasing means comprises of an outer spring, which abuts the ball guide, and an inner spring, disposed coaxially inside the outer spring, the check valve unit can be more firmly fixed to the bottom of the plunger-receiving hole, and the tensioner can resist a strong impact force so that a backlash and fluttering of a timing belt, a timing chain or the like can be significantly suppressed.

DETAILED DESCRIPTION OF THE PREFERRED EMBODIMENTS

Figure 1:
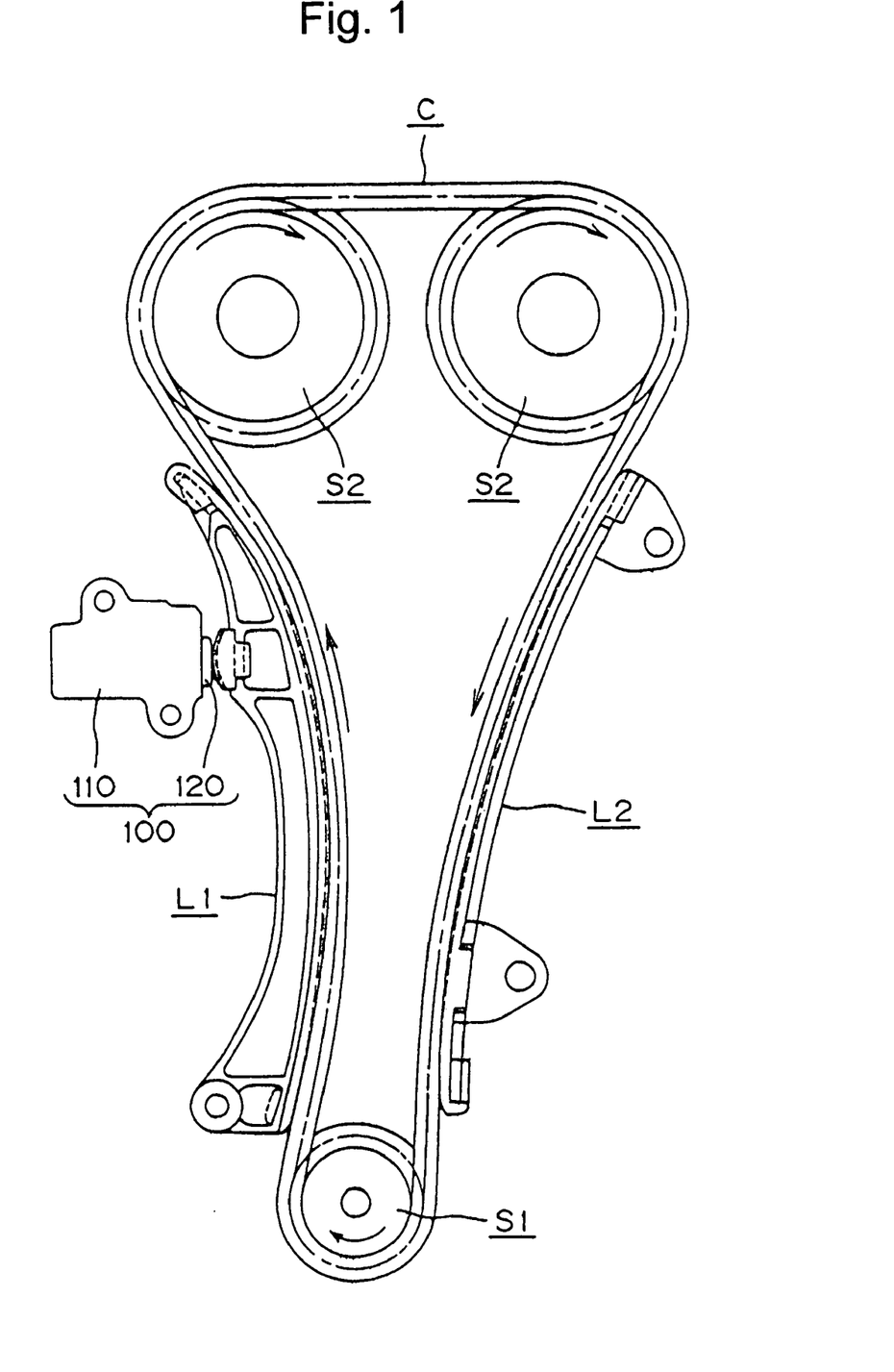
FIG. 1 is a schematic view showing a hydraulic tensioner according to the invention incorporated into the timing drive of an internal combustion engine.

As shown in FIG. 1, a hydraulic tensioner 100, is disposed adjacent the slack side of a timing chain C, which is arranged to drive two camshaft sprockets S2 from a crankshaft sprocket S1. The housing 110 of the tensioner is mounted on the engine, and the plunger 120 protrudes from the housing 110, applying tension to the chain C through pivoted lever L1, by pressing against the back of the lever at a location spaced from the pivot shaft on which the lever is mounted. The tension side of the timing chain C slides on a fixed guide L2. The directions of rotation of the sprockets and movement of the chain are indicated by arrows.

Figure 2:
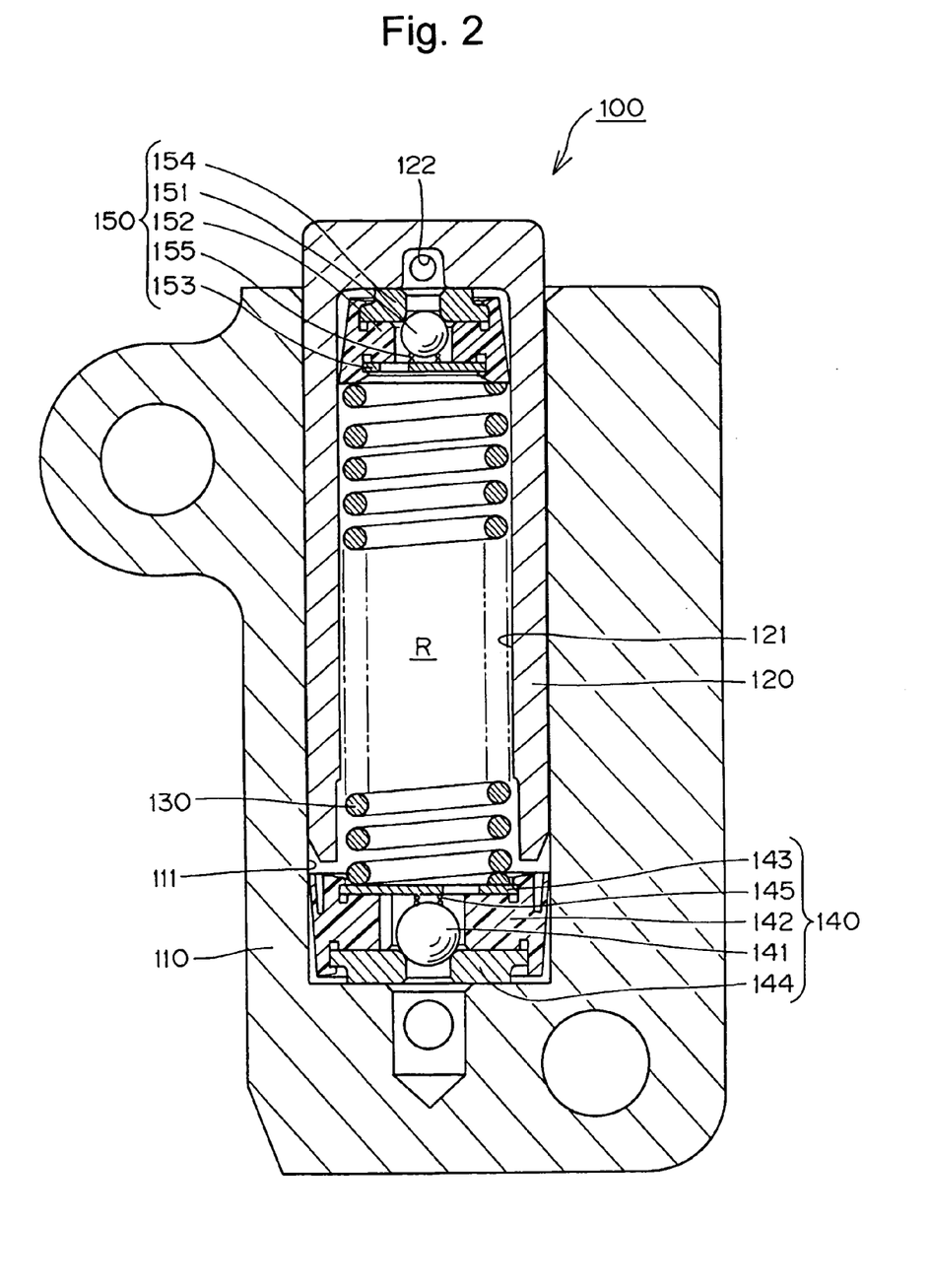
FIG. 2 is a cross-sectional view of the hydraulic tensioner shown in FIG. 1.

As shown in FIG. 2, in the tensioner 100, a cylindrical plunger 120 is slidable in, and protrudes from, a hole 111 formed in the tensioner housing 110. The plunger and the walls of the hole 111 form a high pressure oil chamber R, which also accommodates a plunger-biasing coil spring 130, which urges the plunger 120 in the protruding direction.

A check valve unit 140 incorporated at the bottom, i.e., at the closed end, of hole 111 allows engine oil, under high pressure, to enter the high pressure oil chamber R, but blocks reverse flow. A deairing valve unit 150 is provided inside the plunger adjacent the protruding end, for exhausting air from the high pressure chamber R through a vent port 122. Thus, the check valve unit 140 and the deairing valve unit 150 in this embodiment are disposed adjacent opposite ends of the high pressure oil chamber R.

Figure 3:
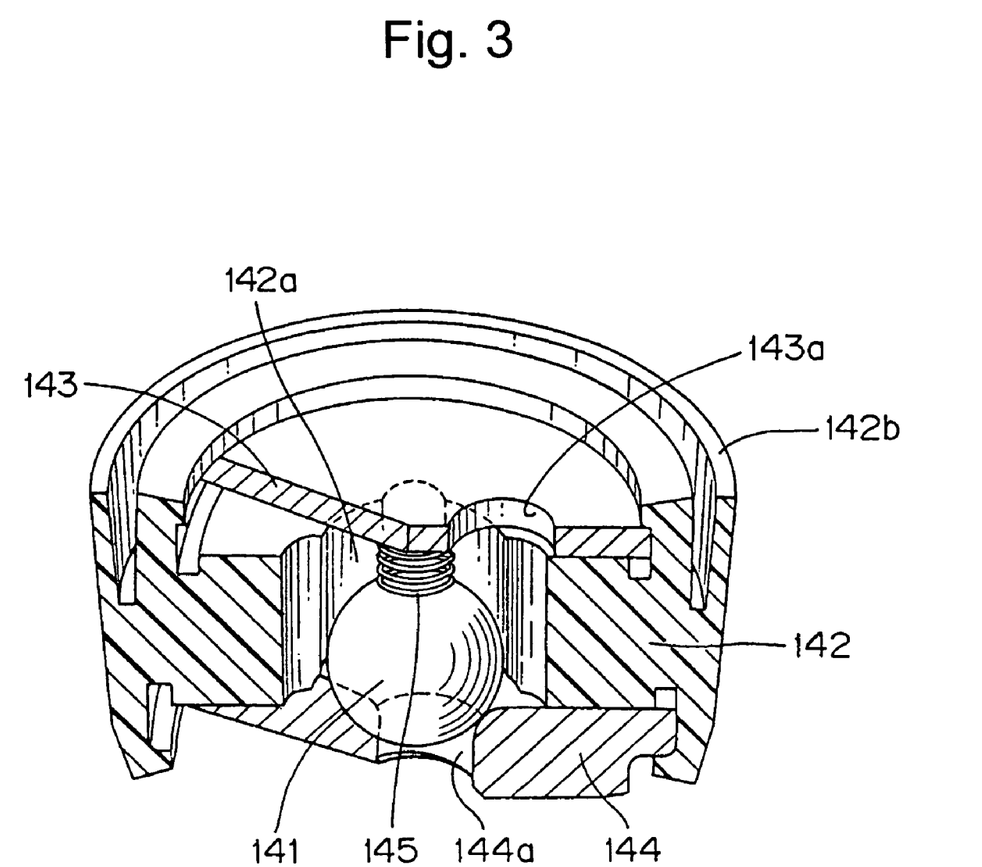
FIG. 3 is an enlarged, partially broken-away, perspective view of a check valve unit in the tensioner of FIG. 2.
Figure 4:
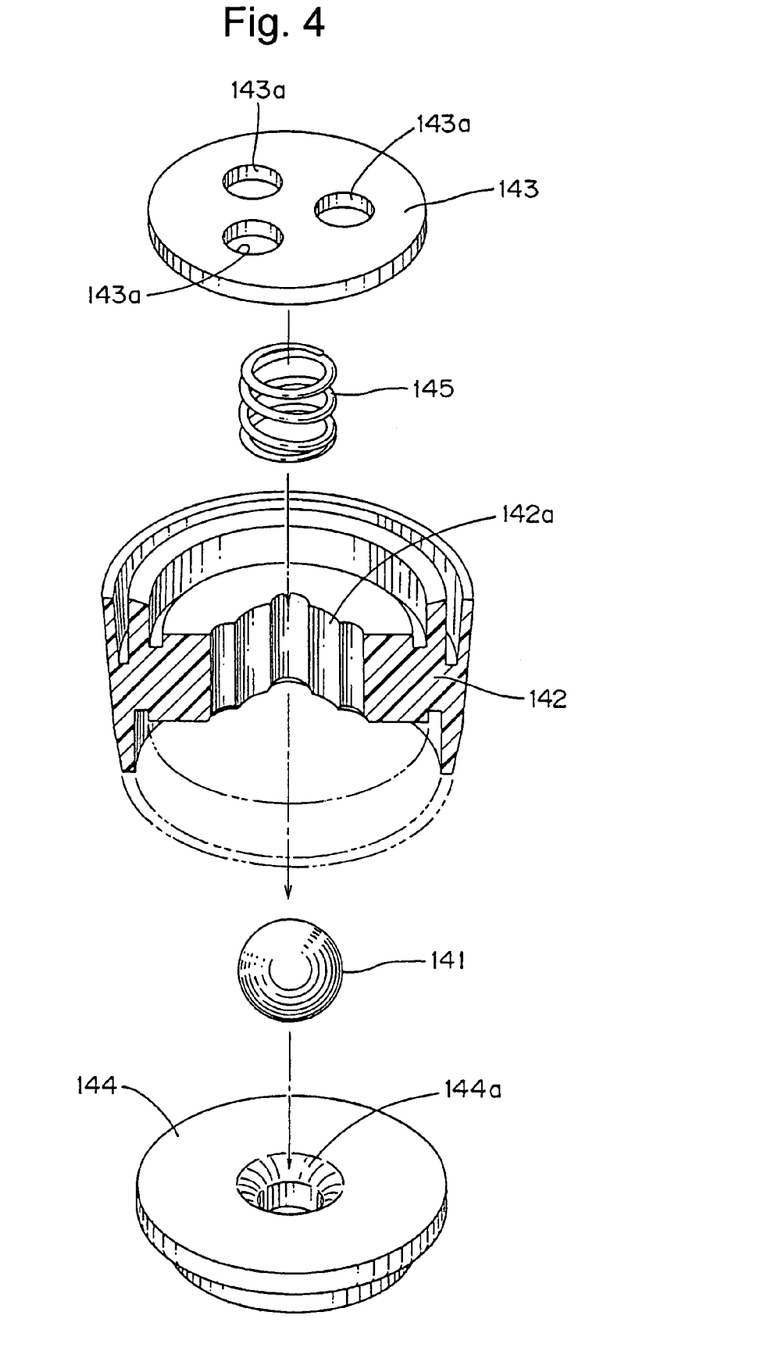
FIG. 4 is an exploded view of the check valve unit shown in FIG. 3.

As shown in FIGS. 3 and 4, the check valve unit 140 is an assembly comprising a check ball 141, and a synthetic resin ball guide 142, in which the ball moves freely between limits. One of the limits is established by a disc-shaped retainer 143, secured to the high pressure oil chamber side of the ball guide 142. The retainer 143 is secured to the ball guide 142 by heating the resin of the ball guide, thereby sealing the ball within the ball guide, using a circumferential flange, formed as a portion of the wall of the ball guide, as a caulk. A metal ball seat 144, similarly secured to the opposite side of the ball guide, establishes the other limit of ball movement. A ball valve biasing spring 145, biases the check ball 141 toward the ball seat 144. The ball and the seat serve as a check valve, allowing oil to enter the high pressure oil chamber R, but blocking reverse flow of oil by seating of the check ball 141 against the ball seat 144.

In the ball guide, the ball is freely movable toward and away from the seat, while constrained by the walls of a guide hole 142a, as shown in FIGS. 3 and 4. The ball guide is provided with an annular tongue 142b, which allows the ball guide 142 to be press-fit into the bottom portion of the hole 111 of the tensioner housing. The shape of the walls of the guide hole, and communication holes 143a in the retainer 143, allow oil to flow from an oil supply, through the inflow hole 144a of the seat, past the ball, and into the high pressure chamber R when the ball is moved away from the seat. The ball valve biasing spring 145 is preferably provided, but can be omitted if the dimensions of the ball and seat are properly selected, and the clearances between the check ball 141 and the ball guide hole 142a, and between the check ball 141 and the retainer 143, are appropriately set.

Figure 5:
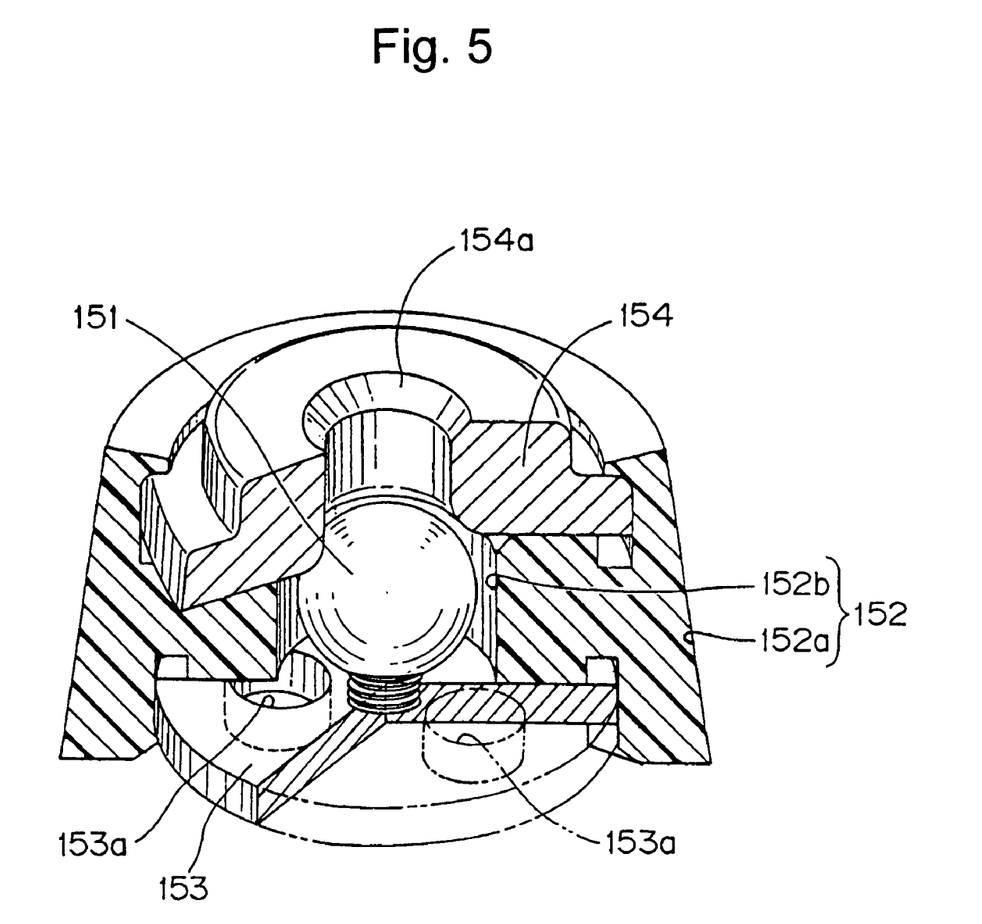
FIG. 5 is an enlarged, partially broken-away, perspective view of the deairing valve unit of the tensioner shown in FIG. 2.
Figure 6:
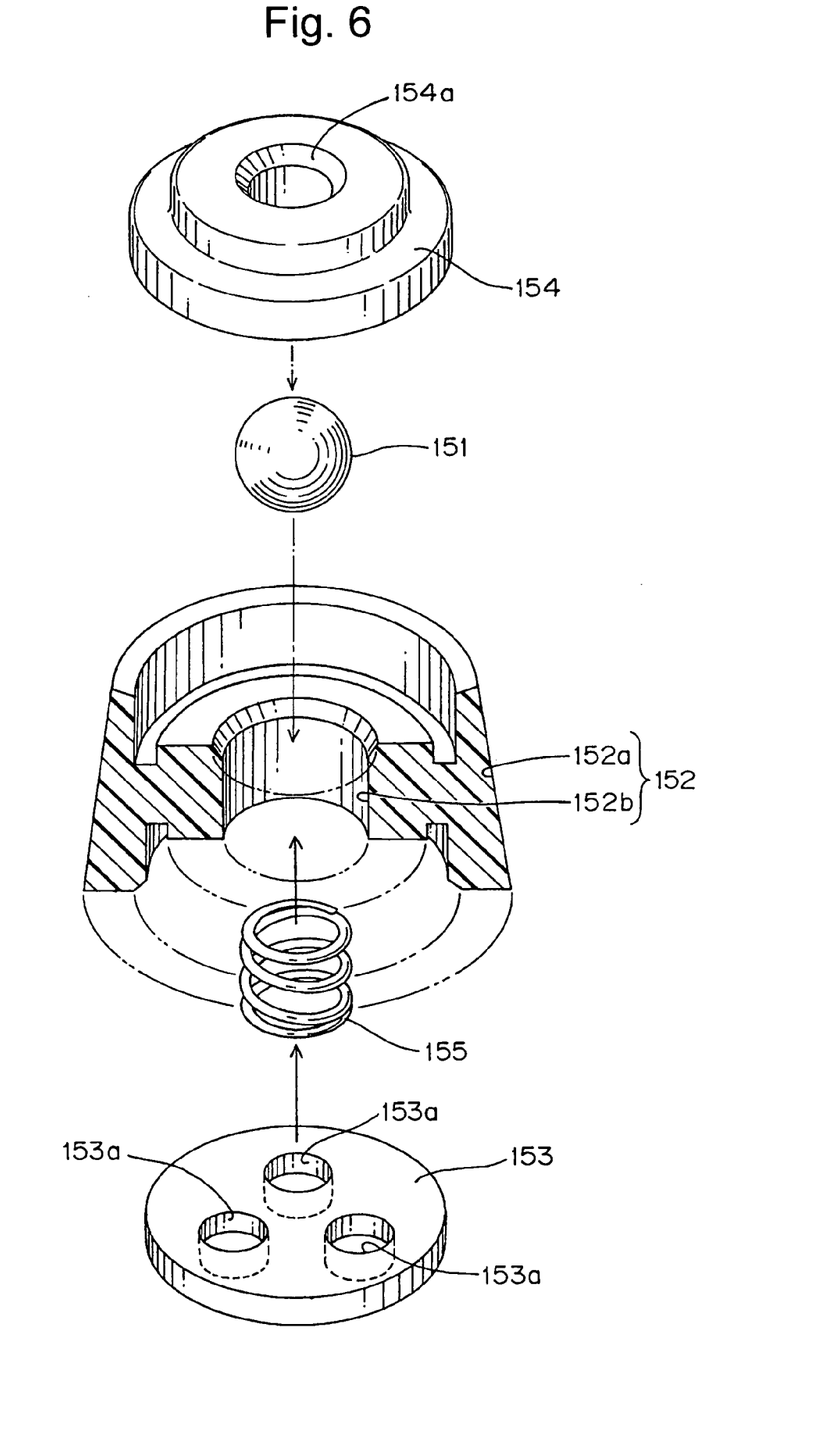
FIG. 6 is an exploded view of the deairing valve unit shown in FIG. 5.

As shown in FIGS. 5 and 6, the deairing valve unit 150, comprises a check ball 151, a synthetic resin ball guide 152, a disc-shaped retainer 153, and a metal ball seat 154. The retainer 153 is secured to an annular wall portion of the guide on the high pressure oil chamber side by heating the resin of the ball guide, thereby using a circumferential flange, formed as a portion of the wall of the ball guide, as a caulk. The retainer has plural, preferably three, apertures 153a, which allow air mixed with oil in the high pressure oil chamber R to enter the ball guide 152. The ball seat 154 is similarly secured to an annular wall portion on the exhaust side in the ball guide 152. The ball is restrained by the inner wall 152b of the ball guide 152, and urged toward the seat 154 by a spring 155, but is movable toward and away from the seat between limits established by the seat and the retainer. When in contact with the seat, the ball blocks the outflow of oil, and of air mixed with the oil. The ball 151 can move away from its seat 154 when a negative pressure exists within the high pressure oil chamber. Such a condition will occur from time to time during operation of the tensioner as the biasing spring 130 moves the plunger in the protruding direction to take up slack in the transmission medium. As the check ball 151 moves away from its seat 154, air in the high pressure oil in chamber R can be exhausted through opening 154a of the seat 154, and exhaust port 122 (FIG. 2).

The ball guide 152 of the deairing valve unit 150 is press-fit into the plunger, and has a tapered outer circumferential wall portion 152a, the outer wall having a larger diameter at the end having the retainer 153, and a smaller diameter at the end having the ball seat. The tapered configuration of the outer wall allows the deairing valve unit 150 to be easily, reliably and firmly incorporated into hole 121 of the plunger.

Since the retainer 153 and the seat are secured to the synthetic resin ball guide during manufacture of the deairing valve unit 150, and the ball 151 and spring 155 are disposed between the seat and the retainer, the unit 150 can be incorporated easily into the plunger without the possibility of losing parts.

As shown in FIG. 2, an end of the plunge-biasing spring 130 reliably abuts the high pressure oil chamber side of the synthetic resin ball guide 152. The spring 130 can expand without abnormal contact with the wall of the hole 121 in the plunger. Therefore, wear and contact noise, due to abnormal contact between the spring and the inner wall of the plunger, can be avoided, and a reliable plunger-biasing action is achieved.

Since the synthetic resin ball guides 142 and 152 are typically used under high temperature conditions, a polyamide resin such as nylon 46, nylon 66, glass fiber-reinforced nylon or the like is preferably used. When the ball seats and retainers are secured to the ball guides 142 and 152, the resin of the ball guides is heated to a softened state. The ball guides therefore exhibit excellent shape retention after the seats and retainers are secured in place.

The retainers 143 and 153 are preferably composed of metal, which is advantageous in the case where the plunger biasing spring directly contacts a retainer, such as retainer 143 in FIG. 2.

The check balls 141 and 151 may be composed of metal, ceramic or synthetic resin, and have diameters such that they can move freely in the synthetic resin ball guides 142 and 152. Check ball 151 may have a slightly smaller diameter than that of check ball 141, since the deairing valve unit 150 needs to be smaller than check valve unit 140 in order to be incorporated into the interior of the plunger.

In the operation of the hydraulic tensioner 100, the high pressure oil chamber R is always filled with oil supplied through the check valve unit 140 from an oil pump or the like. When the timing chain C loosens, the plunger 120, which is continuously biased by the plunger biasing spring 130, moves in the protruding direction, and the check valve unit 140 opens, allowing oil to flow into the high pressure oil chamber R.

When the plunger 120 is pushed into the plunger-receiving hole 111 by an impact force from the timing chain C the pressure of the oil in chamber R is increased and the check ball 141 of the check valve unit 140 is pushed against the ball seat 144, blocking reverse of oil from the high pressure oil chamber R through oil passage 144a in the ball seat 144. As a result, the oil pressure in the high pressure oil chamber R is further increased, and some of the oil leaks through a slight clearance between the outer circumferential surface of the plunger 120 and the inner circumferential surface of the plunger-receiving hole 111 and is discharged to the outside of the housing 110. Because of the viscosity of the oil, the impact force acting on the plunger 120 is absorbed by flow resistance in the clearance surrounding the plunger. Consequently, vibration of the plunger 120 due to the impact force is quickly damped. Therefore, backlash and fluttering due to changes in tension in the timing belt, timing chain or the like, and particularly backlash and fluttering due to the presence of air in the high pressure oil chamber on engine start-up, are suppressed. Additionally, since the check ball 151 in the deairing valve unit 150 is biased by spring 155 in a direction away from the interior of the high pressure oil chamber, when high pressure is required to prevent the plunger from being pushed back, outflow of oil is blocked, and high pressure can be maintained in the oil chamber. However, air is readily exhausted through the exhaust port 122 (FIG. 2), but only when a negative pressure condition has occurred in the housing 110, that is, when the pressure inside the housing, has fallen below the ambient pressure outside the housing.

The manner in which deairing takes place in the dearing valve is as follows.

Upon engine start-up, especially after the engine has been stopped for a long time, much of the oil inside the tensioner will have leaked out of the tensioner, and will have been displaced by air. Upon engine start-up, while the pressure of the oil supplied to the tensioner is still low, the plunger 120 of the tensioner moves forward with a relatively large stroke, under the urging of the plunger-biasing spring 130. The forward movement of the plunger generates a negative pressure inside the high pressure oil chamber R. Upon engine start-up, when the stroke of the plunger is large, a relatively large negative pressure will be generated inside the tensioner.

When the pressure inside the tensioner becomes negative as the plunger slides forward, the check ball 151 of the deairing valve unit 150 separates from the ball seat 154. At this time, a small amount of air can flow, though the deairing check valve, into the high pressure oil chamber R. However, the amount of air flowing into the chamber is very limited because, at the same time, oil form the oil supply is entering the tensioner under pressure through the oil supply check valve unit 140 at the opposite end of the high pressure oil chamber. Thereafter, whether as a result of retracting movement of the plunger, or as a result of the entry of oil from the oil supply into the chamber, the pressure inside the chamber rises, and the check ball of the deairing valve moves toward its seat. A mixture of oil and air from inside the high pressure chamber is discharged through the deairing valve while the ball is moving toward its seat. In other words, the deairing check valve opens momentarily during engine start-up, and air is discharged, along with oil, while the deairing valve is closing. Additional amounts of the mixture of air and oil are discharged through the small clearance between the plunger and the wall of the plunger-receiving hole of the housing.

A negative pressure can be generated in a similar manner during normal engine operation. However, in this case, because most of the oil supply to the tensioner will have been restored, the negative pressure will be smaller than at engine start-up. The de-airing check ball will open only by a relatively small amount in this case, but will continually discharge small amounts of the air-oil mixture inside the tensioner, and thereby maintain the oil inside the tensioner in a substantially incompressible condition, to minimize vibration and fluttering of the traveling transmission medium in which tension is being maintained.

The requirement for accurate control of clearance in a restricted passage, such as a passage formed by a plunger inside wall and a spiral groove on the face of an air vent disc, is avoided, and the structure and assembly of the deairing valve are greatly simplified.

Figure 7:
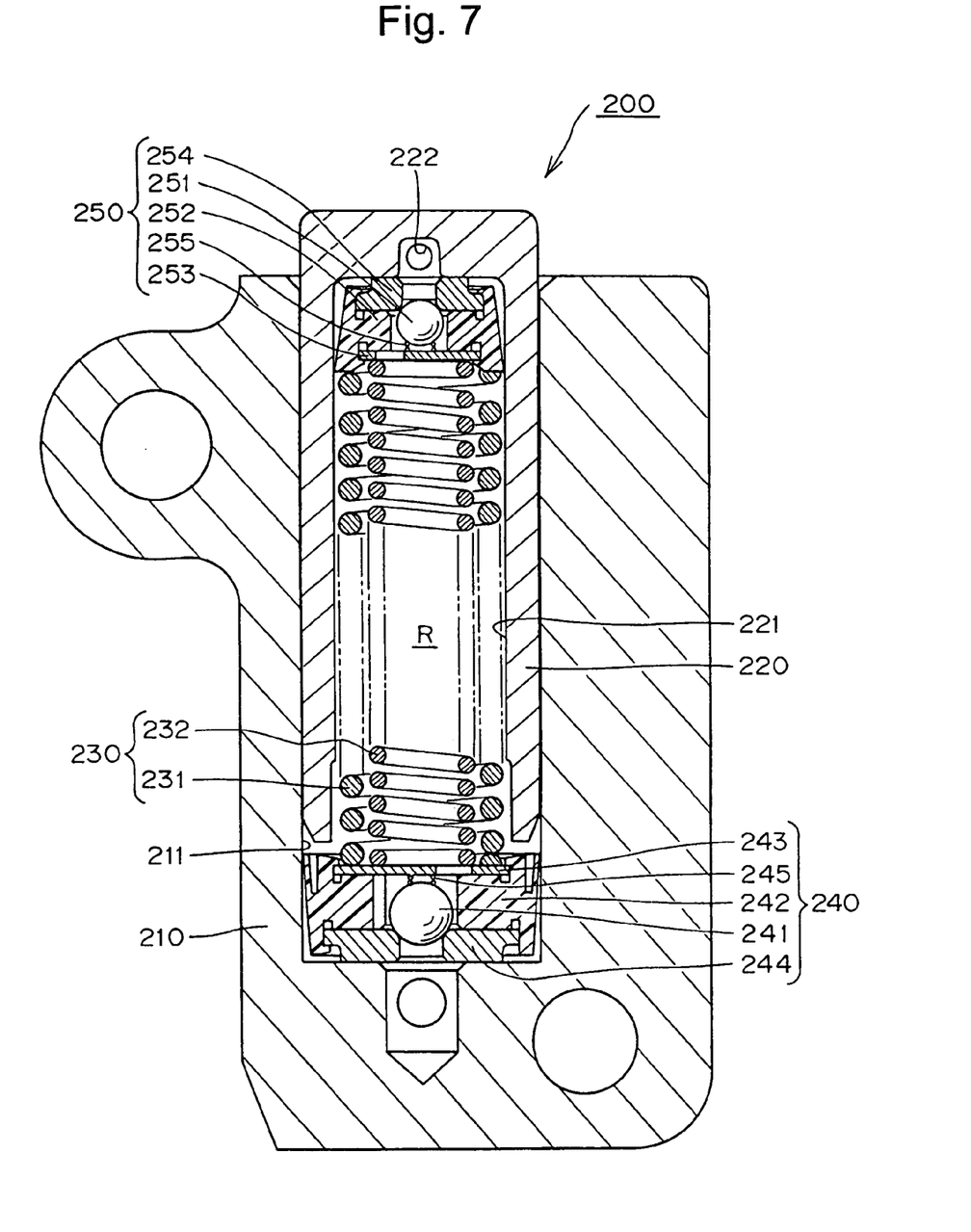
FIG. 7 is a cross-sectional view of a second embodiment of a hydraulic tensioner in accordance with the invention.

The tensioner 200 in accordance with a second embodiment the invention is shown in FIG. 7. This tensioner differs from the tensioner previously described principally in that it includes a plunger-biasing structure 230 comprising an outer spring 231, and an inner spring 232. The outer spring abuts a retainer 243 in a check valve unit 240, and a ball guide 252 in a deairing valve unit 250. The inner spring 232 is coaxial with, and disposed inside, the outer spring. The inner spring abuts retainer 243 of the check valve unit 240 and a retainer 253 of the deairing valve unit. Otherwise, the configuration of the hydraulic tensioner 200 is substantially the same as that of hydraulic tensioner 100. Elements of tensioner 200 shown in FIG. 7 corresponding to those of tensioner 100 are denoted by corresponding reference numbers in the two hundred series.

Since the hydraulic tensioner 200 includes an outer spring 231 and an inner spring 232 arranged coaxially, even if the plunger is moved backward rapidly by an excessively large increase in tension, the springs exhibit a sufficient elastic force to resist the impact, so that a backlash and fluttering are significantly suppressed. Furthermore, since the check valve unit 240 is pressed against the bottom of the plunger-receiving hole 211, and at the same time the deairing valve unit 250 is pressed against the top end of the hole 221 inside the plunger, the check valve unit 240 and the deairing valve unit 250 respectively achieve backflow prevention and deairing in a reliable and stable manner.

The tensioner 200 resists high impact forces, and also blocks outflow of high pressure oil and provides for deairing of the oil inside the tensioner through exhaust vent 222, as in the case of tensioner 100 shown in FIG. 2.

Figure 8:
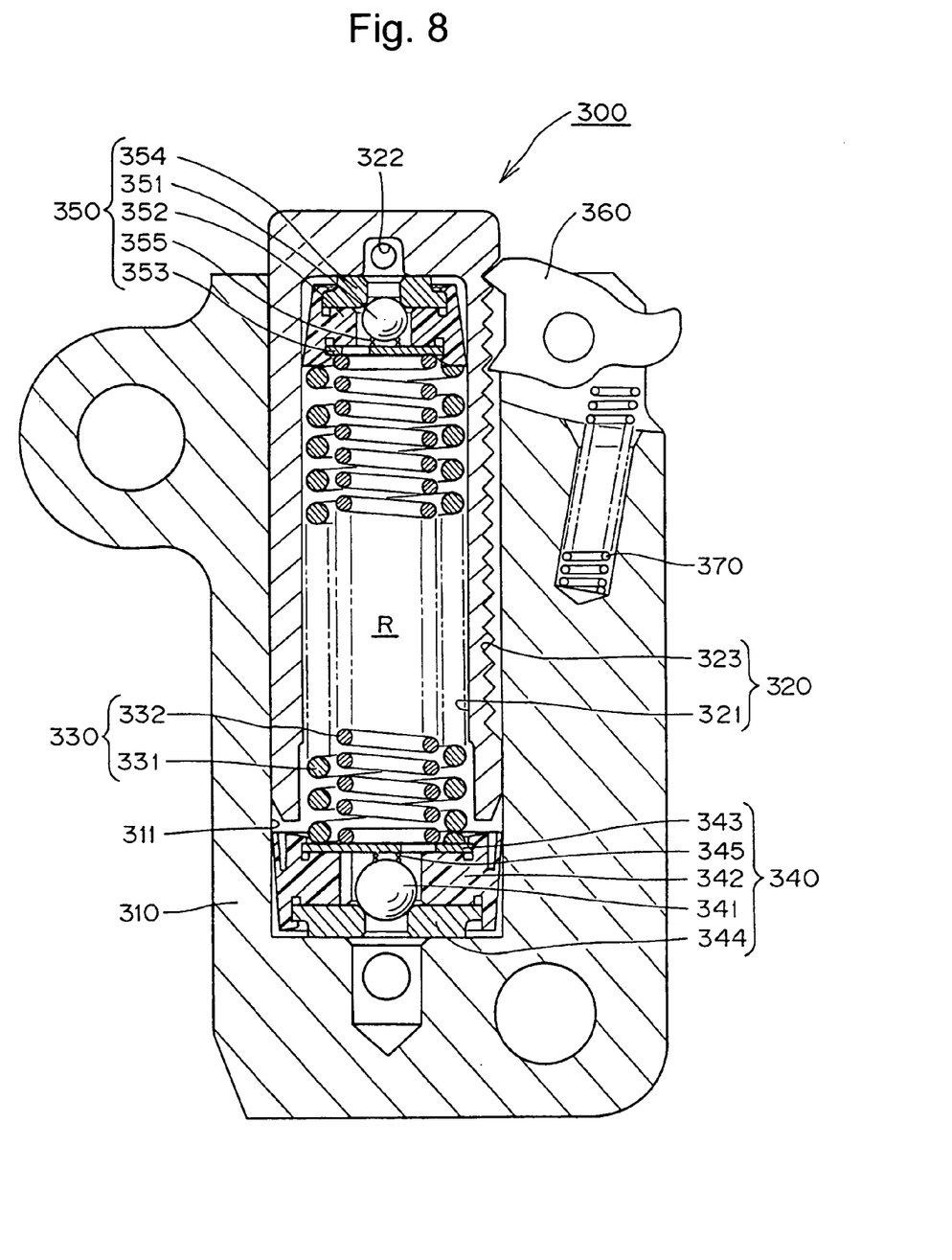
FIG. 8 is a cross-sectional view of a third embodiment of a hydraulic tensioner in accordance with the invention.

The tensioner 300 in accordance with a third embodiment the invention is shown in FIG. 8. This tensioner is similar to the dual spring tensioner 200 of FIG. 7, but differs from tensioner 200 in that the plunger is provided with a ratchet mechanism which blocks the backward movement of the plunger 320 by engagement between a rack 323 formed on the plunger 320 and a pawl 360 pivoted on the housing 310. Otherwise the tensioner 300 is substantially similar to the tensioner 200 of FIG. 7, and elements of tensioner 300, shown in FIG. 8, corresponding to those of tensioner 200, shown in FIG. 7, are denoted by corresponding reference numbers in the three hundred series.

As in the case of tensioner 200, if the plunger 320 is moved backward rapidly by an excessively large increase in tension, the springs 331 and 332 exhibit a sufficient elastic force to resist the impact, so that a backlash and fluttering are significantly suppressed. The ratchet mechanism limits backward movement of the plunger to a maximum corresponding to the backlash of the ratchet. As in the previously described embodiments, since the check valve unit 340 is pressed against the bottom of the plunger-receiving hole 311, and at the same time the deairing valve unit 350 is pressed against the top end of the hole 321 inside the plunger, the check valve unit 340 and the deairing valve unit 350 respectively achieve backflow prevention and deairing in a reliable and stable manner.

We claim:

1. A hydraulic tensioner comprising:
a housing having a plunger-receiving hole with a bottom;
a plunger slidably disposed in the plunger-receiving hole and protruding therefrom, and having a protruding end for applying tension to an endless, flexible, traveling power transmission medium, said plunger being hollow and having an opening facing the bottom of the plunger-receiving hole, and an end wall adjacent said protruding end, said housing and said plunger cooperating to form a high pressure oil chamber part of which is composed of at least a part of the interior of the plunger, and part of which is composed of a part of the interior of the plunger-receiving hole, and an exhaust vent formed in said protruding end of the plunger;
plunger biasing means extending into the interior of the hollow plunger, and disposed between said bottom of the plunger-receiving hole and said end wall of the plunger, said biasing means urging the plunger in the protruding direction; and
a deairing valve unit for releasing air from said high pressure oil chamber through said exhaust vent, said deairing valve unit being disposed inside said hollow plunger adjacent the protruding end thereof;
wherein said deairing valve unit comprises a ball guide, a ball seat secured to the ball guide, a check ball disposed in the ball guide and freely movable toward and away from the ball seat, a ball biasing spring biasing the check ball toward the ball seat, and a disc-shaped retainer, also secured to the ball guide, the retainer limiting movement of the check ball away from the ball seat, and sealing the check ball in the ball guide whereby the check ball is disposed between the retainer and the seat; and
wherein the check ball is disposed on a side of the ball seat facing the interior of the high pressure oil chamber, whereby outflow of oil through said exhaust vent due to an increase in pressure within the high pressure oil chamber is blocked by the seating of the check ball on said seat, but the ball is movable away from the seat as a result of negative pressure within the high pressure oil chamber to permit release of air from within the high pressure oil chamber through said exhaust vent.

2. A hydraulic tensioner according to claim 1, in which said plunger biasing means comprises an outer spring, which abuts the ball guide of the deairing valve unit, and an inner spring, disposed inside, and in coaxial relationship with, said outer spring.

3. A hydraulic tensioner according to claim 1, in which the ball guide of the deairing valve unit is composed of synthetic resin, and in which the retainer and the ball seat in the deairing valve unit are secured to the ball guide by circumferential caulking flanges formed as portions of the wall of the ball guide.

4. A hydraulic tensioner according to claim 3, in which said plunger biasing means comprises an outer spring, which abuts the ball guide of the deairing valve unit, and an inner spring, disposed inside, and in coaxial relationship with, said outer spring.

5. A hydraulic tensioner according to claim 3, in which the ball guide in said deairing valve unit has a tapered outer wall, having a large diameter at an end thereof adjacent the retainer of the deairing valve unit, and a smaller diameter at an end thereof adjacent the ball seat of the deairing valve unit, and in which the deairing valve unit is press-fit into the interior of the plunger.

6. A hydraulic tensioner according to claim 5, in which said plunger biasing means comprises an outer spring, which abuts the ball guide of the deairing valve unit, and an inner spring, disposed inside, and in coaxial relationship with, said outer spring.

7. A hydraulic tensioner according to claim 1, in which the ball guide in said deairing valve unit has a tapered outer wall, having a large diameter at an end thereof adjacent the retainer of the deairing valve unit, and a smaller diameter at an end thereof adjacent the ball seat of the deairing valve unit, and in which the deairing valve unit is press-fit into the interior of the plunger.

8. A hydraulic tensioner according to claim 7, in which said plunger biasing means comprises an outer spring, which abuts the ball guide of the deairing valve unit, and an inner spring, disposed inside, and in coaxial relationship with, said outer spring.

9. A hydraulic tensioner according to claim 1, also comprising a check valve unit disposed within the plunger-receiving hole adjacent the bottom thereof, for blocking backflow of oil from said high pressure oil chamber.

10. A hydraulic tensioner according to claim 9, in which said plunger biasing means comprises an outer spring, which abuts the ball guide of the deairing valve unit, and an inner spring, disposed inside, and in coaxial relationship with, said outer spring.

11. A hydraulic tensioner according to claim 9, in which the ball guide of the deairing valve unit is composed of synthetic resin, and in which the retainer and the ball seat in the deairing valve unit are secured to the ball guide by circumferential caulking flanges formed as portions of the wall of the ball guide.

12. A hydraulic tensioner according to claim 11, in which said plunger biasing means comprises an outer spring, which abuts the ball guide of the deairing valve unit, and an inner spring, disposed inside, and in coaxial relationship with, said outer spring.

13. A hydraulic tensioner according to claim 11, in which the ball guide in said deairing valve unit has a tapered outer wall, having a large diameter at an end thereof adjacent the retainer of the deairing valve unit, and a smaller diameter at an end thereof adjacent the ball seat of the deairing valve unit, and in which the deairing valve unit is press-fit into the interior of the plunger.

14. A hydraulic tensioner according to claim 13, in which said plunger biasing means comprises an outer spring, which abuts the ball guide of the deairing valve unit, and an inner spring, disposed inside, and in coaxial relationship with, said outer spring.

15. A hydraulic tensioner according to claim 9, in which the ball guide in said deairing valve unit has a tapered outer wall, having a large diameter at an end thereof adjacent the retainer of the deairing valve unit, and a smaller diameter at an end thereof adjacent the ball seat of the deairing valve unit, and in which the deairing valve unit is press-fit into the interior of the plunger.

16. A hydraulic tensioner according to claim 15, in which said plunger biasing means comprises an outer spring, which abuts the ball guide of the deairing valve unit, and an inner spring, disposed inside, and in coaxial relationship with, said outer spring.

\* \* \* \* \*